United States Patent
Lim et al.

(10) Patent No.: US 9,240,060 B2
(45) Date of Patent: Jan. 19, 2016

(54) APPARATUS AND METHOD OF GENERATING A TOMOGRAPHIC IMAGE

(71) Applicant: Samsung Electronics Co., Ltd., Suwon-si (KR)

(72) Inventors: Jae-guyn Lim, Seongnam-si (KR); Won-hee Choe, Seoul (KR); Seong-deok Lee, Gunpo-si (KR); Woo-young Jang, Gangneung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 13/737,620

(22) Filed: Jan. 9, 2013

(65) Prior Publication Data
US 2013/0177227 A1 Jul. 11, 2013

(30) Foreign Application Priority Data
Jan. 9, 2012 (KR) .................. 10-2012-0002463

(51) Int. Cl.
*G06K 9/00* (2006.01)
*G06T 11/00* (2006.01)
*G01B 9/02* (2006.01)

(52) U.S. Cl.
CPC .......... *G06T 11/003* (2013.01); *G01B 9/02091* (2013.01); *G01B 9/02* (2013.01)

(58) Field of Classification Search
None
See application file for complete search history.

(56) References Cited

U.S. PATENT DOCUMENTS

| | | | | |
|---|---|---|---|---|
| 2007/0165234 | A1* | 7/2007 | Podoleanu ............. | A61B 3/102 356/451 |
| 2010/0074503 | A1* | 3/2010 | Bruder et al. ................ | 382/131 |
| 2013/0216100 | A1* | 8/2013 | Litvin et al. .................. | 382/103 |

FOREIGN PATENT DOCUMENTS

| | | | | |
|---|---|---|---|---|
| JP | 2011-087813 | A | 5/2011 | |
| KR | 10-2011-0036593 | A | 4/2011 | |
| KR | 10-2011-00334074 | A | 4/2011 | |
| KR | 10-2011-0048159 | A | 5/2011 | |
| WO | WO 2010005091 | A1 * | 1/2010 | ........... G01N 21/47 |

* cited by examiner

*Primary Examiner* — Nirav G Patel
(74) *Attorney, Agent, or Firm* — NSIP Law

(57) ABSTRACT

A method and an apparatus for generating a tomographic image are provided. The method for generating a tomographic image may involve: detecting a principal frequency region corresponding to a portion of a frequency data corresponding to a tomographic image, determining a plurality of sub frequency regions within the principal frequency region, and generating, by a processor, the tomographic image by synthesizing data of the plurality of sub frequency regions.

21 Claims, 10 Drawing Sheets

APPARATUS AND METHOD OF GENERATING A TOMOGRAPHIC IMAGE

CROSS-REFERENCE TO RELATED APPLICATIONS

This application claims the benefit under 35 U.S.C. §119 (a) of Korean Patent Application No. 10-2012-0002463, filed on Jan. 9, 2012, in the Korean Intellectual Property Office, the entire disclosure of which is incorporated herein by reference for all purposes.

BACKGROUND

1. Field

The following description relates to methods and apparatuses for generating a tomography image.

2. Description of Related Art

Tomography relates to a technique of acquiring a sectional image or tomographic image of a target. Such tomographic imaging technologies are used in a variety of fields, such as medicine, radiology, archaeology, biology, geophysics, oceanography, materials science, astrophysics, and the like. For example, in medicine, a tomographic imaging device may be used to inspect target tissues of a human body for the purpose of obtaining diagnosis. Some representative examples of tomographic imaging devices used in medicine include computed tomography (CT) scanners, magnetic resonance imaging (MRI) devices, and optical coherence tomography (OCT) devices. In the field of archaeology and geophysics, tomography may be applied to analyze a geological structure from a tomographic image of a geological exploration target obtained using penetrating waves such as X rays, radio waves, sound waves, or laser radiated to the geological exploration target.

In many such tomographic imaging techniques, a technique of analyzing data of a frequency region is used to generate a cross-sectional image of a target. For example, a CT scanner produces a sinogram from a graph obtained from X-ray photographs taken from 180° or greater angles around a target, and uses a computer to convert the sinogram into data of a frequency region in order to transform the sinogram into sectional image data or a tomographic image data. An OCT device detects an optical coherence signal generated according to different durations while light beams pass through a tissue and are reflected from the tissue, and transforms the detected optical coherence signal into data of a frequency region, thereby producing a high-resolution sectional image for a biological tissue of a human body, such as mucous membranes, skin, and an eyeball. Tomographic images produced by tomographic imaging devices include noise, and a tomographic image generating system capable of reducing such noise is needed.

SUMMARY

In one general aspect, there is provided an image generating method involving: detecting a principal frequency region corresponding to a portion of a frequency data corresponding to a tomographic image; determining a plurality of sub frequency regions within the principal frequency region; and generating, by a processor, the tomographic image by synthesizing data of the plurality of sub frequency regions.

The general aspect of the method may further comprise displaying the generated tomographic image on a display unit.

In the general aspect of the method, the generating of the tomographic image may involve: performing frequency inverse-transformation on the data of each of the plurality of sub frequency regions; forming a plurality of sub images by transforming data obtained from the frequency inverse-transformation into data of a frequency region with respect to a depth direction of a target; and generating the tomographic image of the target by synthesizing the plurality of sub images.

In the general aspect of the method, the generating of the tomographic image may involve calculating an average of pixel data of the sub images.

In the general aspect of the method, the detecting of the principal frequency region may involve selecting a region of the frequency data based on a waveform of the frequency data.

In the general aspect of the method, the data of the frequency region may be distributed substantially symmetrically about a central frequency, and the detecting of the principal frequency region may involve detecting as the principal frequency region only one of the frequency regions symmetrical to each other about the central frequency.

In the general aspect of the method, the determining of the plurality of sub frequency regions may involve determining the plurality of sub frequency regions so that adjacent sub frequency regions are spaced apart from each other at regular intervals.

In the general aspect of the method, the detecting of the principal frequency region may involve: receiving respective pieces of row data of a plurality of frequency regions corresponding to a plurality of partial images; detecting a principal frequency partial region corresponding to a portion of a frequency region for each of the received pieces of row data; and detecting the principal frequency region from the detected principal frequency partial region.

In the general aspect of the method, the detecting of the principal frequency partial region may involve detecting the principal frequency partial region for each piece of row data by comparing each piece of row data with a preset critical intensity; and the detecting of the principal frequency region may involve detecting as the principal frequency region a frequency region comprising all of the detected principal frequency partial regions.

In another general aspect, there is provided an image generating apparatus including: a principal frequency region detection unit configured to detect a principal frequency region corresponding to a portion of a frequency data corresponding to a tomographic image; a sub frequency region determination unit configured to determine a plurality of sub frequency regions within the principal frequency region; and an image generation unit configured to generate the tomographic image by synthesizing data of the plurality of sub frequency regions.

In another general aspect of the apparatus, the image generation unit may include: a sub frequency region inverse-transformation unit configured to perform frequency inverse-transformation on data of each of the plurality of sub frequency regions; a vertical direction frequency region transformation unit configured to form a plurality of sub images by transforming each data obtained from the frequency inverse-transformation into data of a frequency region with respect to a depth direction of a target; and a synthesis unit configured to generate the tomographic image by synthesizing the plurality of sub images.

In another general aspect of the apparatus, the synthesis unit may be configured to generate the tomographic image by calculating an average of pixel data of the plurality of the sub images.

In another general aspect of the apparatus, the principal frequency region detection unit may be configured to detect the principal frequency region based on a waveform of the frequency data corresponding to the tomographic image.

In another general aspect of the apparatus, the data of the frequency region may be distributed substantially symmetrically about a central frequency, and the principal frequency region detection unit may be configured to detect as the principal frequency region only one of the frequency regions symmetrical to each other about the central frequency.

The general aspect of the apparatus may further include a frequency region transformation unit configured to transform a signal corresponding to the tomographic image into the frequency data, and the principal frequency region detection unit may be configured to detect a principal frequency region corresponding to a portion of the frequency data.

In another general aspect of the apparatus, the principal frequency region detection unit may be configured to detect a principal frequency partial region corresponding to a portion of a frequency region of each of respective pieces of row data of a plurality of frequency regions corresponding to a plurality of partial images, and to detect the principal frequency region from the detected principal frequency partial regions.

In another general aspect of the apparatus, the principal frequency partial region detection unit may be configured to detect the principal frequency partial region for each piece of row data by comparing each piece of row data with a preset critical intensity, and to detect a frequency region including all of the detected principal frequency partial regions as the principal frequency region.

In another general aspect of the apparatus, the sub frequency region determination unit may be configured to determine a plurality of sub frequency regions so that adjacent sub frequency regions are spaced apart from each other at regular intervals.

In another general aspect, there is provided an optical coherence tomography (OCT) apparatus including: a light generation unit configured to generate an optical signal; an interferometer configured to split the optical signal into a measurement signal and a reference signal and applies the measurement signal to a target; a detector configured to detect a coherence signal generated by interference between a response signal received from the target and the reference signal; and an image processing device configured to generate a tomographic image from the coherence signal, the image processing unit comprising: a frequency region transformation unit configured to transform the coherence signal into data of a frequency region; a principal frequency region detection unit configured to detect a principal frequency region corresponding to a portion of the data of the frequency region; a sub frequency region determination unit configured to determine a plurality of sub frequency regions from the data of the frequency region based on the principal frequency region; and an image generation unit configured to generate a tomographic image by using data of the plurality of sub frequency regions.

In the general aspect of the OCT apparatus, the image processing unit may further include: a sub frequency region inverse-transformation unit configured to perform frequency inverse-transformation on data of each sub frequency region; a vertical direction frequency region transformation unit configured to form a plurality of sub images by transforming each data obtained from the frequency inverse-transformation into data of a frequency region with respect to a depth direction of a target; and a synthesis unit configured to generate the tomographic image by synthesizing the plurality of sub images.

In another general aspect, there is provided a non-transitory computer-readable recording medium having recorded thereon a program for executing the image generating method described above.

Other features and aspects may be apparent from the following detailed description, the drawings, and the claims.

Figure 1:
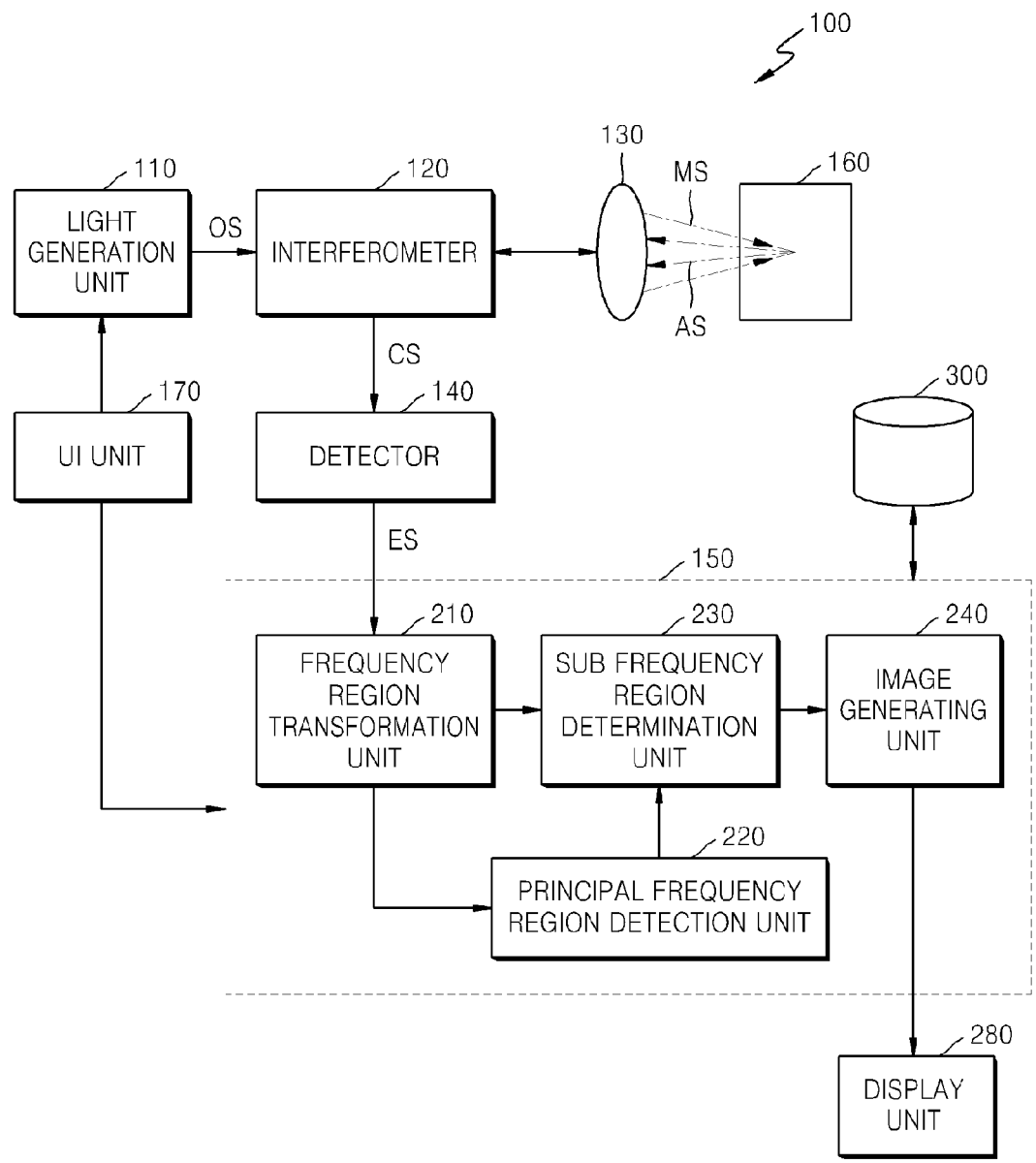
FIG. 1 is a schematic diagram of an example of an optical coherence tomography (OCT) apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Expressions such as "at least one of," when preceding a list of elements, modify the entire list of elements and do not modify the individual elements of the list.

Provided below are examples of methods for generating a tomographic image having reduced noise. Also provided are non-transitory computer-readable recording media having recorded thereon a computer program for executing the described methods, and examples of apparatuses for generating a tomographic image in which noise is reduced or eliminated.

Reference will now be made in detail to various examples in view of the accompanying drawings. FIG. 1 is a schematic diagram illustrating an example of an optical coherence tomography (OCT) apparatus 100. Referring to FIG. 1, the OCT apparatus 100 includes a light generation unit 110, an interferometer 120, a detector 140, and an image processing device 150. The light generation unit 110 generates an optical signal OS. For example, when a medical expert such as a doctor inputs a command to a user interface (UI) unit 170 to capture a tomographic image for a certain part of a patient's body, the light generation unit 110 may generate the optical signal OS. The UI unit 170 may be an input device, such as a keyboard or a mouse. However, the UI unit 170 may also be a Graphical User Interface (GUI) displayed on a display unit 280. The display unit 280 may be a touch screen.

Examples of the types of optical signal OS generated by the light generation unit 110 may include a super luminescent diode (SLD) signal and an edge-emitting light emitting diode (ELED) signal. The light generation unit 110 may include an SLD, an ELED, or other light generating component. However, the type of light that may be generated by the light generating unit 110 is not limited thereto, and may be any of other various optical signals. In one example, the light generation unit 110 may generate near-infred light as the optical signal OS. The optical signal OS generated by the light generation unit 110 is transmitted to the interferometer 120. The optical signal OS may be transmitted to the interferometer 120 through free space or through a transmission medium. An example of suitable transmission medium is optical fiber.

Figure 2:
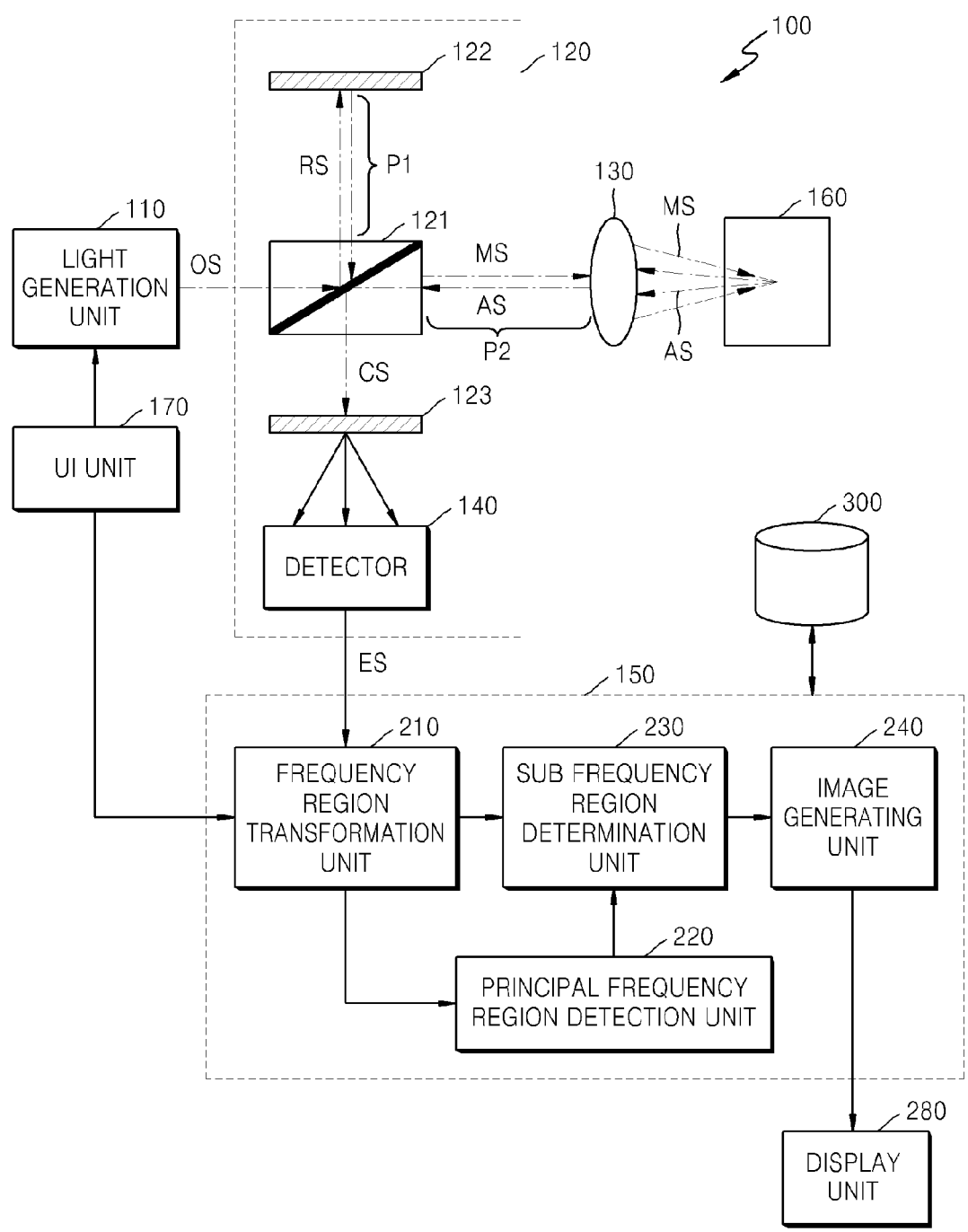
FIG. 2 is a schematic diagram illustrating the OCT apparatus illustrated in FIG. 1.

Referring to FIG. 2, the interferometer 120 of the illustrated example of an OCT apparatus 100 receives the optical signal OS and splits the optical signal OS into a measurement signal MS and a reference signal RS. To this end, the interferometer 120 may include at least two signal paths P1 and P2. The measurement signal MS of the optical signal OS may be transmitted via the path P2, and the reference signal RS thereof may be transmitted via the path P1.

Referring to FIG. 2, the interferometer 120 splits the optical signal OS into the measurement signal MS and the reference signal RS by using a beam splitter 121 in free space. A part of the optical signal OS is reflected by the beam splitter 121, and the other part thereof passes through the beam splitter 121. The part of the optical signal OS that is reflected by the beam splitter 121 may be used as the reference signal RS, and the part of the optical signal OS that passes through the beam splitter 121 may be used as the measurement signal MS. Alternatively, the interferometer 120 may transmit the measurement signal MS via one of at least two paths formed of predetermined transmission media, and may transmit the reference signal RS via the other path.

The interferometer 120 may split the optical signal OS into the measurement signal MS and the reference signal RS according to a predetermined division ratio. The division ratio may be defined as a ratio of an output intensity of the measurement signal MS to an output intensity of the reference signal RS. For example, the interferometer 120 may split the optical signal OS into the measurement signal MS and the reference signal RS according to a ratio of 5:5. The interferometer 120 may also split the optical signal OS into the measurement signal MS and the reference signal RS according to a ratio of 9:1 or any other division ratio. In this example, a beam splitter 121 is used to split the optical signal OS. However, in other examples, other techniques are used to split the optical signal OS. When a beam splitter 121 is used to split the optical signal OS as illustrated in FIG. 2, the division ratio may depend on transmission and reflection characteristics of the beam splitter 121.

The interferometer 120 transmits the measurement signal MS to the probe 130. The probe 130 applies the measurement signal MS to a target 160. The measurement signal MS applied from the probe 130 is reflected or scattered off the target 160. The probe 130 receives a response signal AS reflected or scattered off the target 160, and transmits the response signal AS to the interferometer 120. The response signal AS may be transmitted to the interferometer 120 through free space or through a transmission medium such as optical fibers.

In the example illustrated in FIG. 2, the reference signal RS is transmitted to the reference mirror 122 via the path P1 in the interferometer 120, reflected by the reference mirror 122, and transmitted to the beam splitter 121. A part of the reference signal RS transmitted to the beam splitter 121 is reflected by the beam splitter 121, and the other part thereof passes through the beam splitter 121. The reference signal RS that passes through the beam splitter 121 interferes with the response signal AS reflected by the beam splitter 121. A coherence signal CS generated by the interference between the response signal AS and the reference signal RS is input to the detector 140. The detector 140 detects the coherence signal CS. As illustrated in FIG. 2, the coherence signal CS may be first diffracted by a diffraction grating 123 and then detected by the detector 140.

The detector 140 may detect the coherence signal CS by transforming an optical signal input to the detector 140 into an electrical signal ES that is proportional to an optical intensity of the optical signal. The detector 140 may detect the coherence signal CS by using a light receiving unit. Examples of the light receiving unit that may be used include a photo detector. The electrical signal ES detected by the detector 140 is transmitted to the image processing device 150 to generate a tomographic image.

Figure 3:
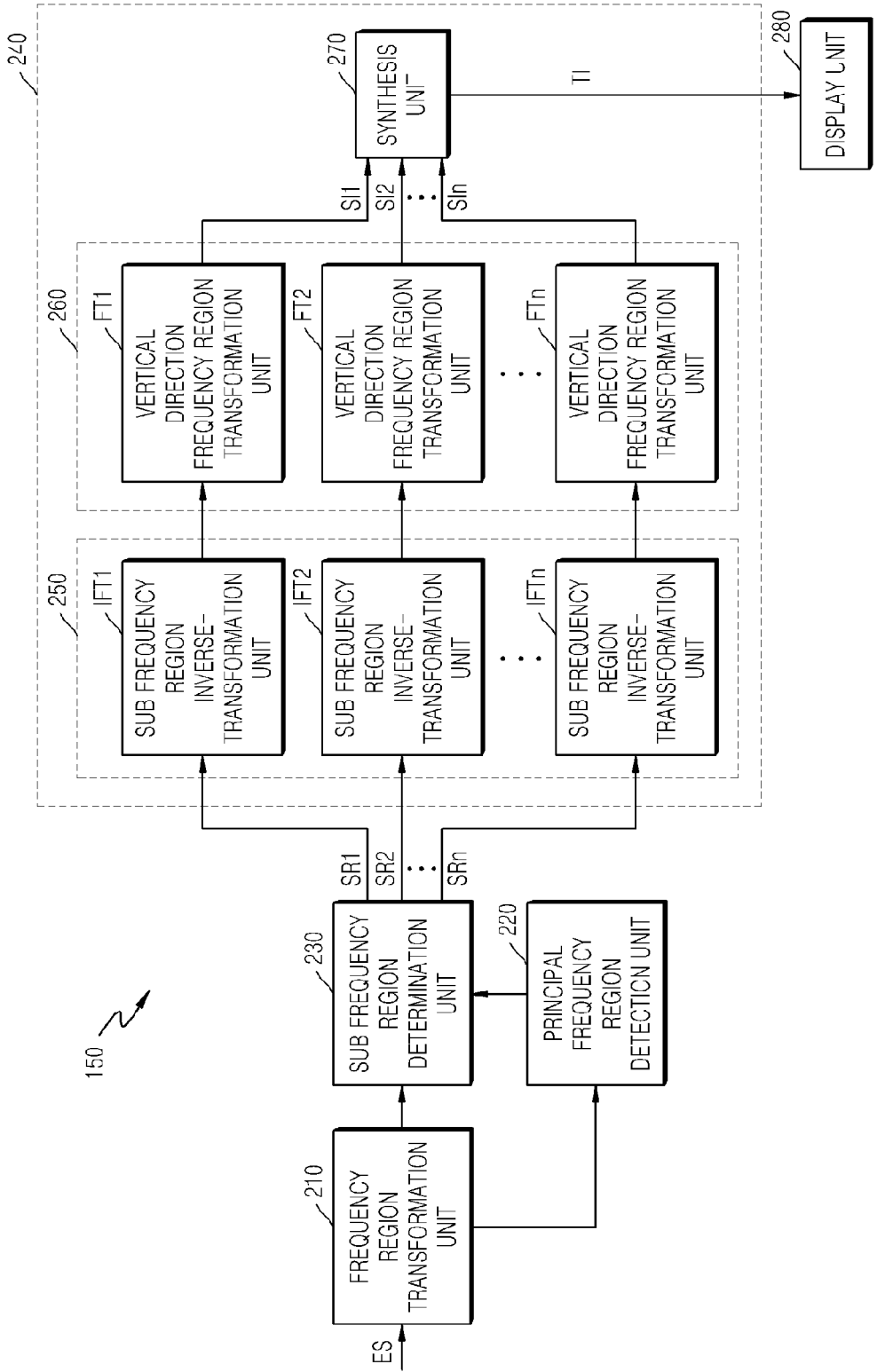
FIG. 3 is a schematic diagram of another example of a tomographic image generating apparatus.

FIG. 3 is a schematic diagram illustrating an example of an image processing device 150. The image processing device 150 shown in FIG. 3 is only an example of image processing devices that may used in a tomographic image generating method, and it will be understood by those of ordinary skill in the art that various changes in form and details may be made to the components illustrated in FIG. 3. In this example, the image processing device 150 generates a tomographic image of the target 160 by using the electrical signal ES received from the detector 140.

The image processing device 150 includes a frequency region transformation unit 210, a principal frequency region detection unit 220, a sub frequency region determination unit 230, and an image generating unit 240. In an example, the image processing device 150 may be manufactured with chips that exclusively perform functions of the components listed above. In other examples, the image processing device 150 may be implemented using an exclusive program stored in a general-use central processing unit (CPU) and a storage unit 300. The image processing device 150 may retrieve or store information in the storage unit 300, as illustrated in FIGS. 1 and 2. The frequency region transformation unit 210 receives the coherence signal CS detected by the detector 140, and transforms the coherence signal CS of a time domain corresponding to the tomographic image of the target 160 into data of a frequency domain corresponding to the tomographic image of the target 160. The transformation into the frequency domain data may be performed by using a Fourier transform or Hilbert transform, or by using any other well-known method.

From a total frequency region of the frequency domain data, which represents the tomographic image of the target 160, the principal frequency region detection unit 220 detects a principal frequency region representing the meaningful image information about the target 160, without regions that include noise information. For example, the principal frequency region detection unit 220 detects the principal frequency region from the total frequency region of the frequency domain data, based on a waveform of the frequency domain data.

Figure 7:
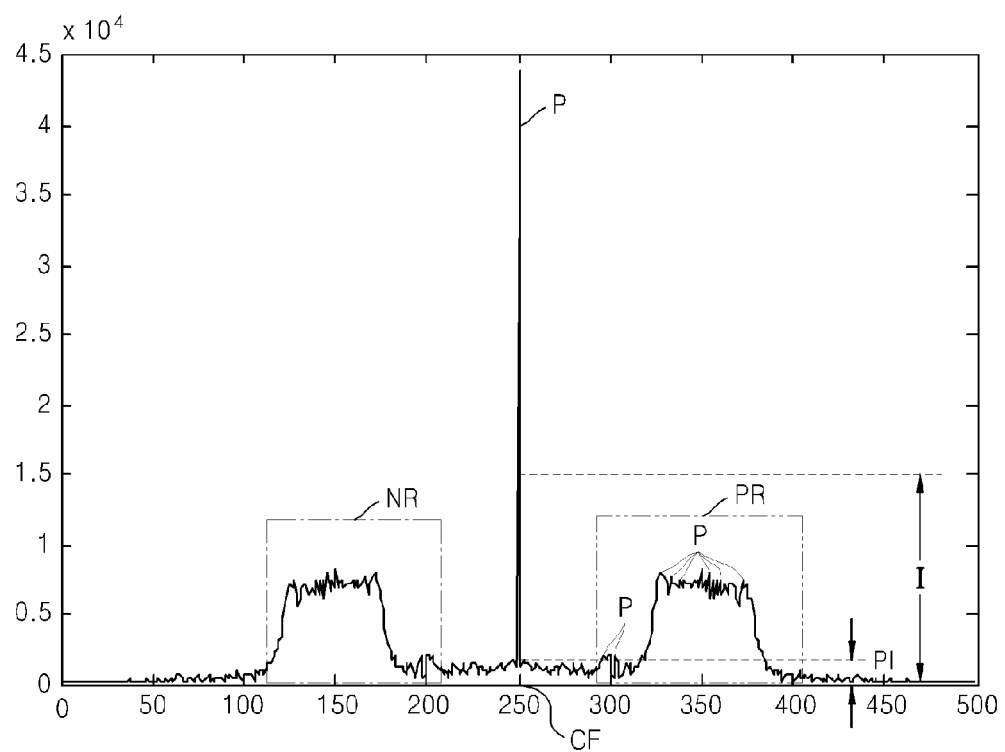
FIG. 7 is a graph illustrates a method of detecting a principal frequency region used by an example of a principal frequency region detection unit.

FIG. 7 is a graph illustrating an example of a method of detecting a principal frequency region PR by the principal frequency region detection unit 220 illustrated in FIG. 3. The principal frequency region detection unit 220 may detect the principal frequency region PR by comparing data of a frequency region with a predetermined critical intensity PI. For example, the principal frequency region detection unit 220 may divide the data of a frequency region into frequency regions spaced apart at regular intervals, detect respective peaks P for each of the frequency regions, and compare the sizes of the peaks P with the preset critical intensity PI, thereby detecting the principal frequency region PR. At this time, the principal frequency region detection unit 220 may determine a frequency of a peak exceeding a preset critical value I from among the peaks P to be a central frequency CF, and detect as the principal frequency region PR a continuous frequency region that includes a frequency including a peak farthest from the central frequency CF and a frequency including a peak closest to the central frequency CF from among the peaks P with sizes exceeding the preset critical intensity PI.

Alternatively, the principal frequency region detection unit 220 may detect as the principal frequency region PR only one of frequency regions that are symmetrical about the central frequency CF of the frequency region data. Referring to FIG. 7, a right region of the central frequency CF may be detected as the principal frequency region PR. Alternatively, a left region of the central frequency CF may be detected as a principal frequency region NR.

Figure 11:
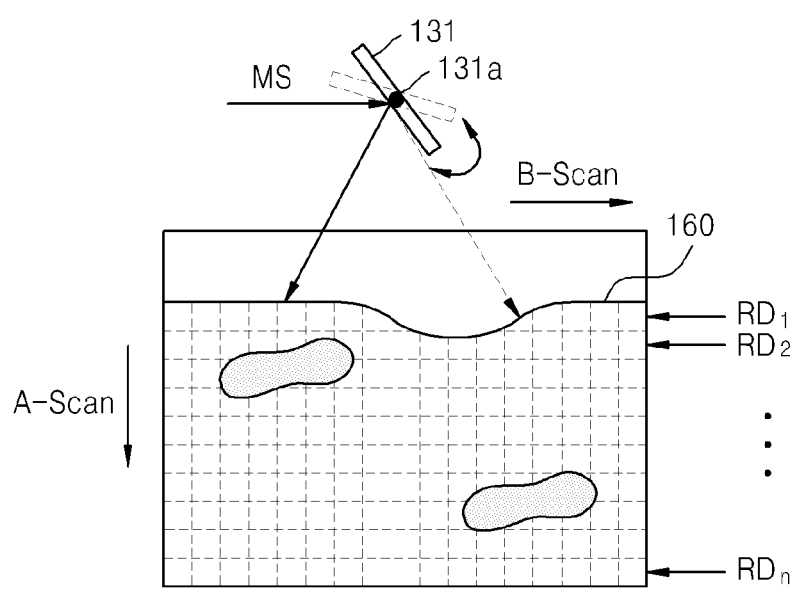
FIG. 11 is a diagram illustrating an example of a process of acquiring pieces of row data of a plurality of frequency regions.

FIG. 11 is a diagram illustrating an example of a process of acquiring first through N-th row data $RD_1$ through $RD_n$ of a plurality of frequency regions. Referring to FIG. 11, the measurement signal MS is reflected by a scan mirror 131 rotating around a shaft 131a and is then applied to the target 160. As the scan mirror 131 rotates, the measurement signal MS is applied in a lateral direction of the target 160 (i.e., B-scan). In this process, the response signal AS reflected or scattered off the target 160 is detected and transformed into data of a frequency region, thereby obtaining the first row data $RD_1$ of the frequency region. The first through n-th row data $RD_1$-$RD_n$ may be obtained via scanning in a vertical direction of the target 160, corresponding to a reflectivity profile known as an A-scan. The vertical direction of the target 160 may denote a direction perpendicular to the lateral direction scan of the target 160, corresponding to a cross-sectional tomography known as B-Scan. In this example, the first through n-th row data $RD_1$-$RD_n$ of the frequency regions may be simultaneously acquired during one rotation of the scan mirror 131. In an alternative example, the first through n-th row data $RD_1$-$RD_n$ of the frequency regions may be sequentially acquired via repetitive rotations of the scan mirror 131.

Figure 8:
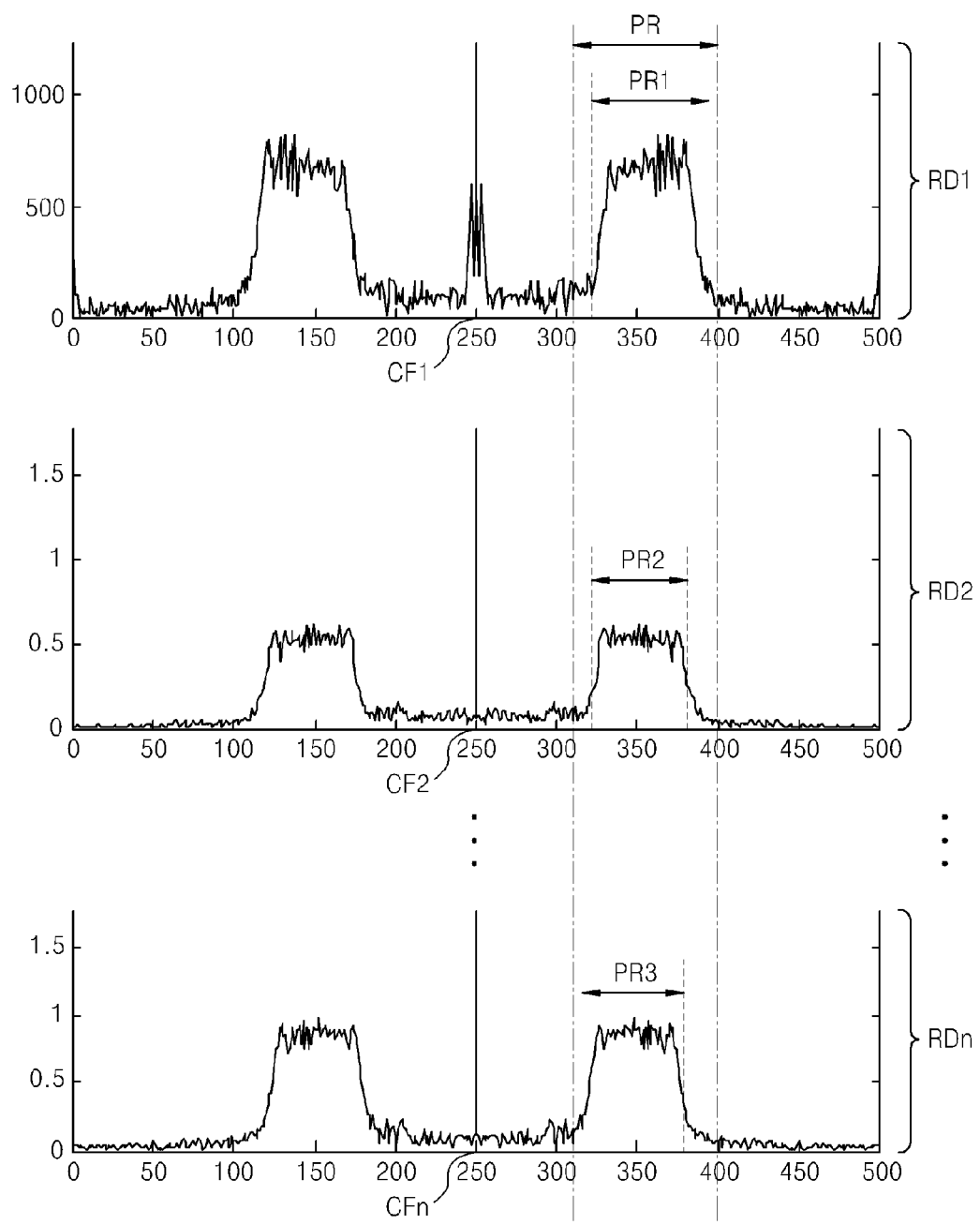
FIG. 8 is a graph illustrates a method of detecting a principal frequency region used by another example of a principal frequency region detection unit.

FIG. 8 is a graph illustrating an example of a method of detecting the principal frequency region PR by an example of a principal frequency region detection unit 220. Referring to FIG. 8, the principal frequency region detection unit 220 may detect the principal frequency partial regions PR1, PR2 . . . PRn for the row data $RD_1$-$RD_n$, respectively, of a plurality of frequency regions representing information about a plurality of partial images into which a tomographic image is divided, and may detect the principal frequency region PR from the principal frequency partial regions PR1, PR2 . . . PRn.

The principal frequency region detection unit 220 may detect the principal frequency partial regions PR1, PR2 . . . PRn for the respective row data $RD_1$-$RD_n$ of the frequency regions, respectively, by comparing the row data $RD_1$-$RD_n$ with the preset critical intensity PI. For example, the principal frequency region detection unit 220 may divide each of the row data $RD_1$-$RD_n$ into frequency regions spaced apart at regular intervals, detect respective peaks P of the frequency regions, and compare the sizes of the peaks P with the preset critical intensity PI, thereby detecting the principal frequency partial regions PR1, PR2 . . . PRn for the row data $RD_1$-$RD_n$. At this time, the principal frequency region detection unit 220 may determine frequencies of peaks exceeding the preset critical value I from among the peaks P to be central frequencies CF1-CFn for the row data $RD_1$-$RD_n$, and detect, as the principal frequency partial regions PR1, PR2 . . . PRn for the row data $RD_1$-$RD_n$, continuous frequency regions that include frequencies to which peaks farthest from the central frequencies CF1-CFn belong and frequencies to which peaks closest to the central frequencies CF1-CFn belong from among the peaks P with sizes exceeding the preset critical intensity PI.

Alternatively, the principal frequency region detection unit 220 may detect as each of the principal frequency partial regions PR1, PR2 . . . PRn only a frequency region on one of two sides horizontally symmetrical about each of the central frequencies CF1-CFn of the row data $RD_1$-$RD_n$ of the frequency regions. The principal frequency region detection unit 220 may detect a frequency region including all of the detected principal frequency partial regions PR1, PR2 . . . PRn as the principal frequency region PR. The sub frequency region determination unit 230 determines a plurality of sub frequency regions SR1-SRn from the data of the frequency region based on the principal frequency region PR detected by the principal frequency region detection unit 220.

Figure 9:
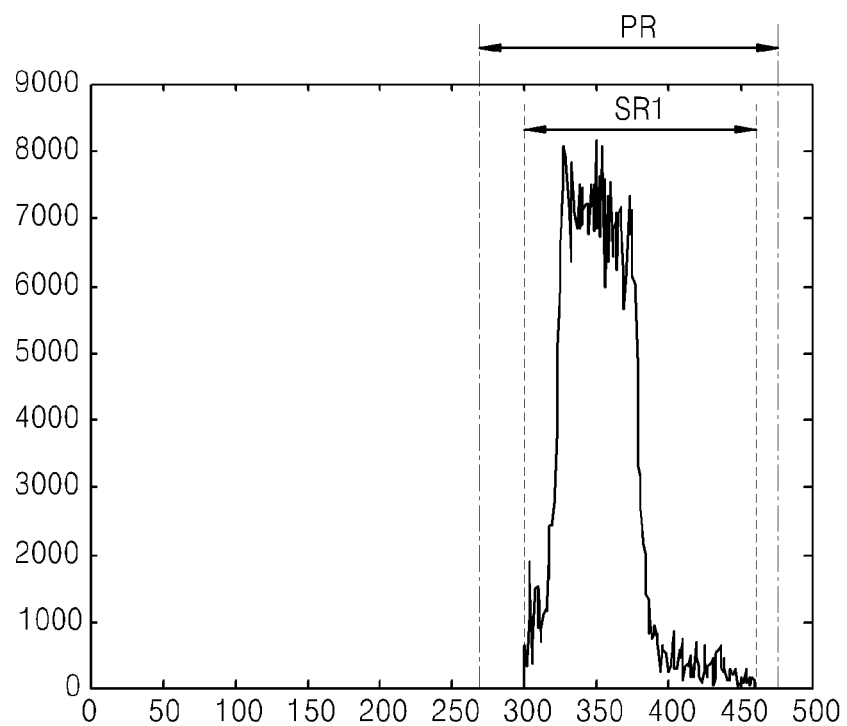
FIG. 9 is a graph illustrating an example of a method of determining sub frequency regions.
Figure 9:
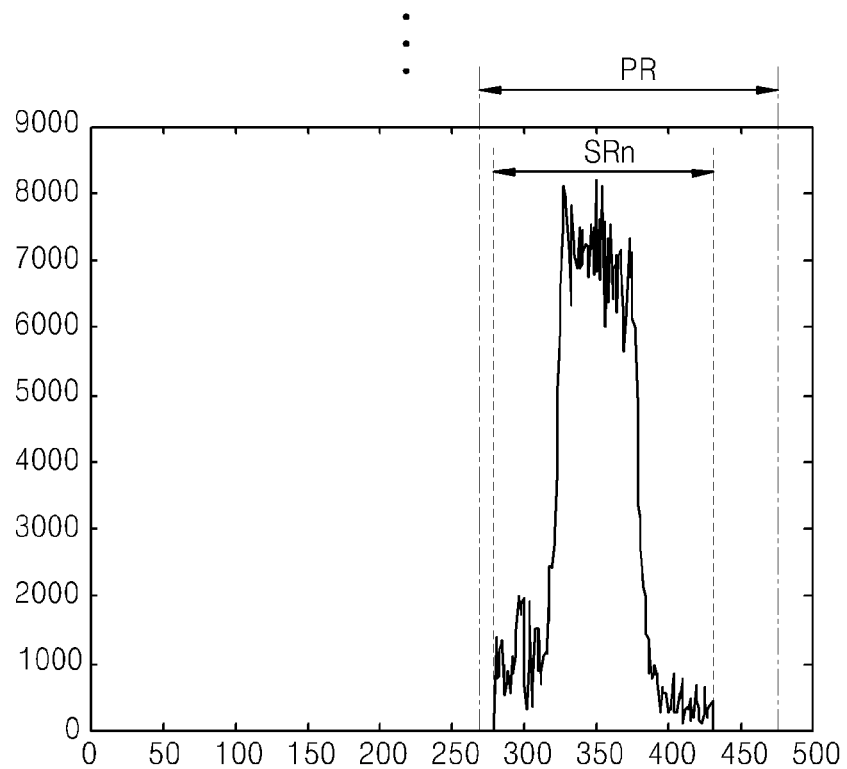

FIG. 9 is a graph illustrating a method of determining sub frequency regions SR1-SRn. Referring to FIG. 9, the sub frequency region determination unit 230 may determine a plurality of frequency regions included in the principal frequency region PR detected by the principal frequency region detection unit 220 to be the sub frequency regions SR1-SRn. The sub frequency region determination unit 230 may determine the sub frequency regions SR1-SRn so that adjacent sub frequency regions are spaced at regular intervals. The image generating unit 240 generates the tomographic image of the target 160 by using the data of the sub frequency regions SR1-SRn as determined by the sub frequency region determination unit 230.

Referring back to FIG. 3, the image generating unit 240 includes a sub frequency region inverse-transformation unit 250, a vertical frequency region transformation unit 260, and a synthesis unit 270. The sub frequency region inverse-transformation unit 250 performs frequency inverse-transformation on the data of each of the sub frequency regions SR1-SRn. The vertical frequency region transformation unit 260 transforms each data resulting from the frequency inverse-transformation with respect to a depth direction of the target into data of a frequency region to produce a plurality of sub images SI1-SI3. The synthesis unit 270 synthesizes the sub images SI1-SI3 to produce a tomographic image TI of the target 160. For example, the synthesis unit 270 may produce the tomographic image TI calculating the average of respective pixel data of the sub images SI1-SI3. The synthesis unit 270 may include a processor and a memory storage.

The display unit 280 displays the tomographic image TI. The display unit 280, which is a device that receives an image signal from the image processing device 150 and outputs an image, may be a separate device existing outside the image processing device 150 or may be included in the image processing device 150. The display unit 280 may include an LCD screen, a touch screen, or other display screen.

Figure 4:
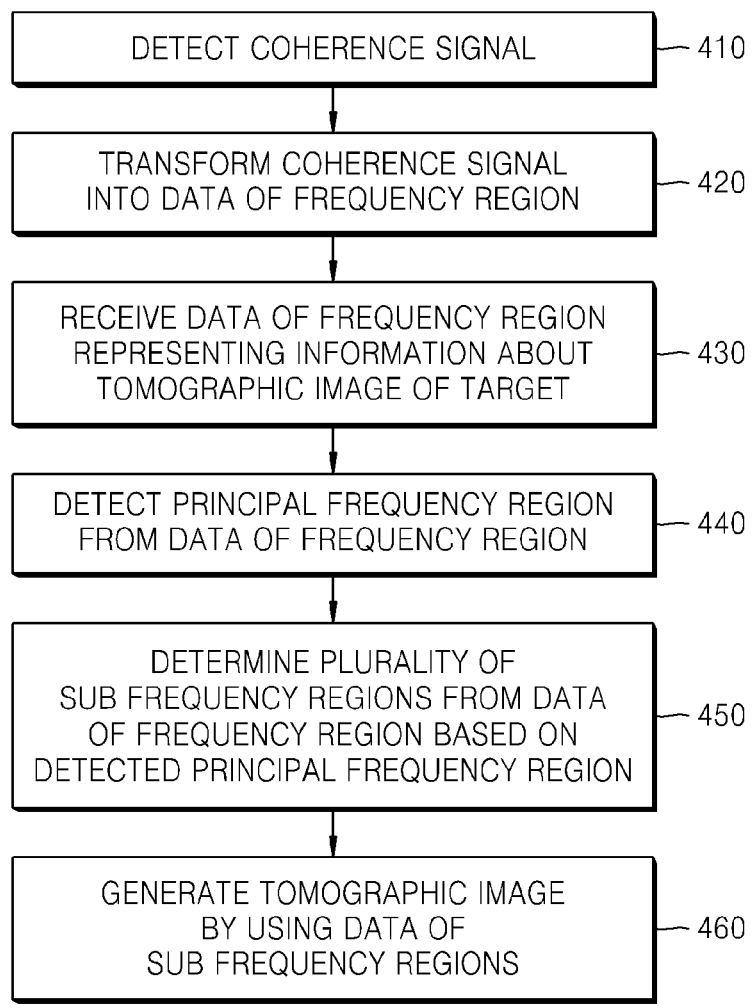
FIGS. 4 through 6 are flowcharts illustrating an example of a tomographic image generating method.

FIG. 4 is a flowchart illustrating an example of a tomographic image generating method. The tomographic image generating method of FIG. 4 includes operations sequentially performed by the image processing device 150 of FIG. 3. Accordingly, the description given above with respect to the image processing device 150 or matters easily inferable by one of ordinary skill in the art may be applied even to non-described matters of the tomographic image generating method of FIG. 4. In operation 410, a coherence signal is detected. The operation 410 may be performed by generating an optical signal, splitting the optical signal into a measurement signal and a reference signal, applying the measurement signal to a target, and detecting a coherence signal generated by interference between a response signal received from the target in response to the application and the reference signal. For example, the coherence signal may be transformed into the electrical signal ES that is proportional to an optical intensity of the coherence signal by the detector 140. The detector 140 may detect the coherence signal by using a photo detector.

Although an operation of detecting the coherence signal is illustrated above, the tomographic image generating method is not limited to generation of a tomographic image of a target from the coherence signal, and the tomographic image of the target may be generated by detecting and analyzing any other signal corresponding to the tomographic image. In operation 420, the coherence signal detected by the detector 140 is transformed into data of a frequency region. The image processing device 150 may include at least one processor. In frequency region transformation performed by using a processor, the discrete Fourier transform may be used, but the frequency region transformation is not limited thereto. For example, the Hilbert transform may be used.

In operation 430, the data of the frequency region corresponding to the tomographic image of the target 160 is received. In operation 440, the principal frequency region detection unit 220 detects a principal frequency region from the data of the frequency region.

Referring to FIG. 7, the principal frequency region detection unit 220 may detect the principal frequency region PR by comparing the data of the frequency region with the predetermined critical intensity PI. For example, the principal frequency region detection unit 220 may split the data of the frequency region into frequency regions spaced apart at regular intervals, detect the respective peaks P of the frequency regions, and compare the sizes of the detected peaks P with the preset critical intensity PI, thereby detecting the principal frequency region PR. At this time, the principal frequency region detection unit 220 may determine a frequency of a peak exceeding the preset critical value I from among the peaks P to be the central frequency CF, and detect as the principal frequency region PR a continuous frequency region that includes a frequency including a peak farthest from the central frequency CF and a frequency including a peak closest to the central frequency CF from among peaks P with sizes exceeding the preset critical intensity PI. The principal frequency region detection unit 220 may detect as the principal frequency region PR only one of frequency regions which are symmetrical about the central frequency CF of the frequency region data.

Figure 5:
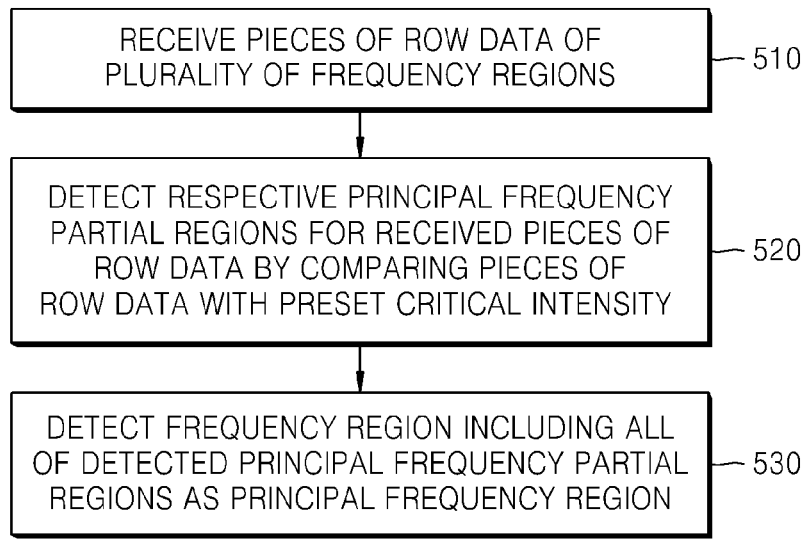

FIG. 5 is a flowchart illustrating an example of the operation 440 of the tomographic image generating method illustrated in FIG. 4. In operation 510 pieces of row data of a plurality of frequency regions corresponding to partial images into which the tomographic image is divided are received. In operation 520, the principal frequency region detection unit 220 may detect the principal frequency partial regions PR1, PR2 . . . PRn for the row data $RD_1$-$RD_n$ of the frequency regions by comparing the row data $RD_1$-$RD_n$ with the preset critical intensity PI.

In operation 530, the principal frequency region detection unit 220 may detect the frequency region including all of the detected principal frequency partial regions PR1, PR2 . . . PRn as the principal frequency region PR. Referring back to FIG. 4, in operation 450, the sub frequency region determination unit 230 determines a plurality of sub frequency regions from the data of the frequency region based on the detected principal frequency region PR. Referring to FIG. 9, the sub frequency region determination unit 230 may determine a plurality of frequency regions included in the principal frequency region PR detected by the principal frequency region detection unit 220 to be sub frequency regions SR1-SRn. The sub frequency region determination unit 230 may determine the sub frequency regions SR1-SRn so that adjacent sub frequency regions are spaced apart from each other at regular intervals. In operation 460, the image producing unit 240 generates the tomographic image of the target 160 by using the data of the sub frequency regions SR1-SRn.

Figure 6:
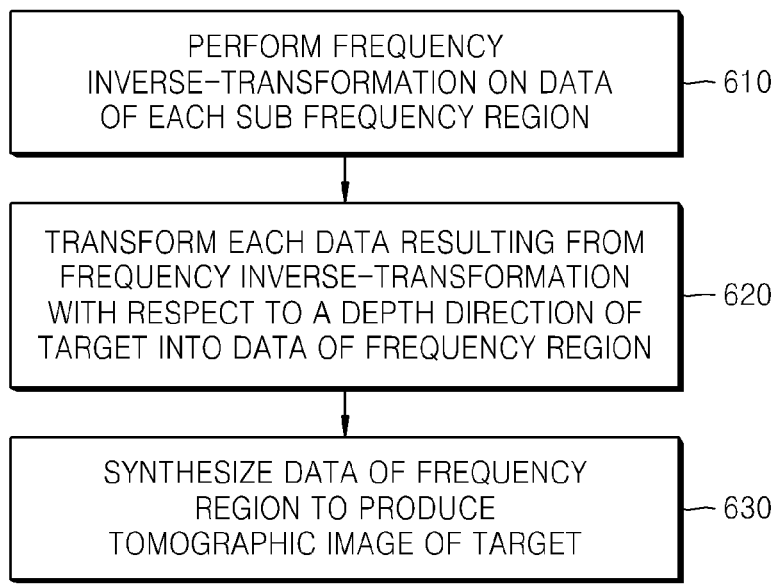

FIG. 6 is a flowchart that illustrates an example of the operation 460 of the tomographic image generating method illustrated in FIG. 4. In operation 610, the sub frequency region inverse-transformation unit 250 performs frequency inverse-transformation on the data of each of the sub frequency regions SR1-SRn. In operation 620, the vertical frequency region transformation unit 260 transforms each data resulting from the frequency inverse-transformation with respect to a depth direction of the target into data of a frequency region, thereby forming the plurality of sub images SI1-SI3. In operation 630, the synthesis unit 270 synthesizes the sub images SI1-SI3 to produce the tomographic image of the target 160. For example, the synthesis unit 270 may produce the tomographic image of the target 160 by calculating the average of the respective pixel data of the sub images SI1-SI3.

Figure 10:
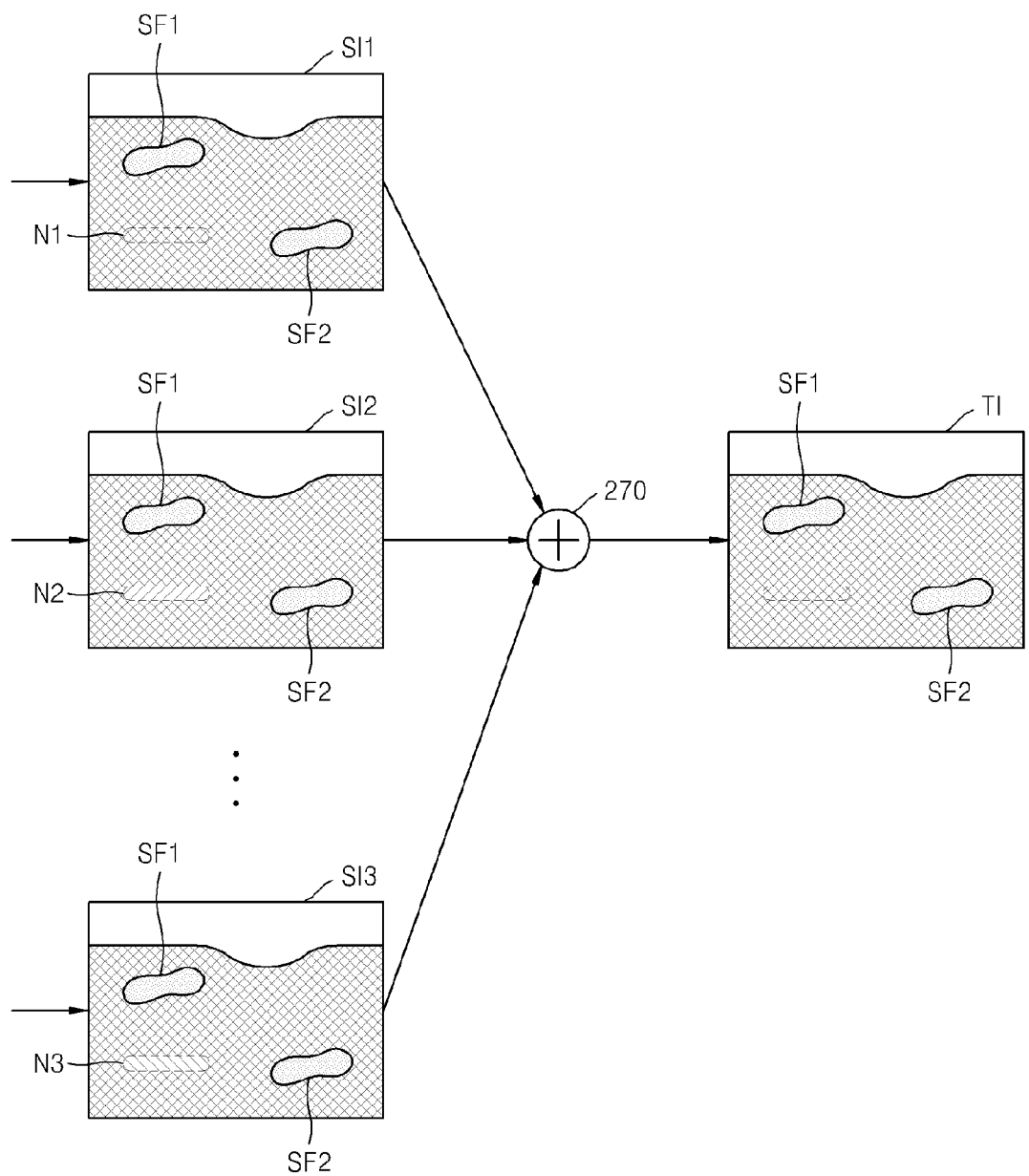
FIG. 10 is a diagram illustrating an example of a method of reducing noise in a tomographic image generated by an optical coherence tomographic image generating method.

FIG. 10 is a diagram illustrating an example of a method for reducing noise in a tomographic image generated by an optical coherence tomographic image generating method. In this example, the synthesis unit 270 may calculate the average of data SI1-SI3 of sub frequency regions to produce the tomographic image TI of the target 160. In this example, because the sub frequency regions are detected based on a principal frequency region, main components of feature regions SF1 and SF2 included in a tomographic image of the target 160 appear similar in the data SI1-SI3 of the sub frequency regions. Accordingly, the feature regions SF1 and SF2 included in the tomographic image of the target 160 may be shown clearly on the tomographic image TI generated by synthesizing the data SI1-SI3 of the sub frequency regions.

Irregular noise components N1-N3 may be also present in the data SI1-SI3 of the sub frequency regions. The irregular noise components N1-N3 may be absent in one or more of data SI1-SI3. During the synthesis of the data SI1-SI3, the irregular noise components N1-N3 may be offset to produce a tomographic image TI in which the noise level is reduced or eliminated. The tomographic image generating methods according to the examples illustrated in FIGS. 4-6 can be implemented as computer programs, or can be executed on a general-use digital computer. In addition, the computer program can be stored on a non-transitory computer readable recording medium and executed on a computer or a processor. Examples of a suitable non-transitory computer readable recording medium include magnetic storage medium such as a ROM, a floppy disk, a hard disk, and the like, and an optical recording medium such as a CD-ROM, a DVD, and the like. The computer may include a CPU and a non-transitory memory storage, such as a hard disk.

As described above, according to the one or more of the above examples, a tomographic image of a target may have reduced noise, and thus a high-resolution tomographic image may be obtained.

A unit described herein may be implemented using both hardware components and software components, including a processing device, a non-transitory memory storage, an amplifier, and the like. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. A user interface unit 170, an image generating unit 240, and an image processing unit 150 may include a memory storage and a processor. The processing device may run an operating system (OS) and one or more software applications that run on the OS. The processing device also may access, store, manipulate, process, and create data in response to execution of the software.

For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software component of a unit may include a computer program, a piece of code, an instruction, or some combination thereof, for independently or collectively instructing or configuring the processing device to operate as desired. Software and data may be embodied permanently or temporarily in any type of machine, component, physical or virtual equipment, a non-transitory computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image generating method comprising:
   detecting a principal frequency region corresponding to a portion of a frequency data corresponding to a tomographic image;
   determining a plurality of sub frequency regions within the principal frequency region; and
   generating, by a processor, the tomographic image by synthesizing data of the plurality of sub frequency regions,
   wherein the principal frequency region is detected by dividing the frequency data into frequency regions and comparing peaks of the divided frequency regions with a preset critical intensity.

2. The image generating method of claim 1, wherein the detecting of the principal frequency region comprises:
   dividing the frequency data into the frequency regions by dividing the frequency data at regular intervals into the frequency regions;
   comparing the peaks of each of the divided frequency regions with the preset critical intensity; and
   detecting the principal frequency region based on the comparing results.

3. The image generating method of claim 1, wherein the generating of the tomographic image comprises:
   performing frequency inverse-transformation on the data of each of the plurality of sub frequency regions;
   forming a plurality of sub images by transforming data obtained from the frequency inverse-transformation into data of a frequency region with respect to a depth direction of a target; and
   generating the tomographic image of the target by synthesizing the plurality of sub images.

4. The image generating method of claim 1, wherein the detecting of the principal frequency region comprises selecting a region of the frequency data based on a waveform of the frequency data.

5. A non-transitory computer-readable recording medium having recorded thereon a program for executing the image generating method of claim 1.

6. An image generating method comprising:
   detecting a principal frequency region corresponding to a portion of a frequency data corresponding to a tomographic image;
   determining a plurality of sub frequency regions within the principal frequency region; and
   generating, by a processor, the tomographic image by synthesizing data of the plurality of sub frequency regions,
   wherein the generating of the tomographic image comprises:
   performing frequency inverse-transformation on the data of each of the plurality of sub frequency regions;

forming a plurality of sub images by transforming data obtained from the frequency inverse-transformation into data of a frequency region with respect to a depth direction of a target; and generating the tomographic image of the target by synthesizing the plurality of sub images, wherein the generating of the tomographic image comprises calculating an average of pixel data of the sub images.

7. An image generating method comprising:

detecting a principal frequency region corresponding to a portion of a frequency data corresponding to a tomographic image;

determining a plurality of sub frequency regions within the principal frequency region; and generating, by a processor, the tomographic image by synthesizing data of the plurality of sub frequency regions, wherein the data of the frequency region is distributed symmetrically about a central frequency, and the detecting of the principal frequency region comprises detecting as the principal frequency region only one of the frequency regions symmetrical to each other about the central frequency.

8. The image generating method of claim 7, wherein the determining of the plurality of sub frequency regions comprises determining the plurality of sub frequency regions so that adjacent sub frequency regions are spaced apart from each other at regular intervals.

9. An image generating method comprising:

detecting a principal frequency region corresponding to a portion of a frequency data corresponding to a tomographic image;

determining a plurality of sub frequency regions within the principal frequency region; and generating, by a processor, the tomographic image by synthesizing data of the plurality of sub frequency regions, wherein the detecting of the principal frequency region comprises:

receiving respective pieces of row data of a plurality of frequency regions corresponding to a plurality of partial images;

detecting a principal frequency partial region corresponding to a portion of a frequency region for each of the received pieces of row data; and detecting the principal frequency region from the detected principal frequency partial region.

10. The image generating method of claim 9, wherein the detecting of the principal frequency partial region comprises detecting the principal frequency partial region for each piece of row data by comparing each piece of row data with a preset critical intensity; and the detecting of the principal frequency region comprises detecting as the principal frequency region a frequency region comprising all of the detected principal frequency partial regions.

11. An image generating apparatus comprising:

a principal frequency region detection unit comprising a processor and configured to detect a principal frequency region corresponding to a portion of a frequency data corresponding to a tomographic image;

a sub frequency region determination unit configured to determine a plurality of sub frequency regions within the principal frequency region; and an image generation unit configured to generate the tomographic image by synthesizing data of the plurality of sub frequency regions, wherein the principal frequency region detection unit detects the principal frequency region by dividing the frequency data into frequency regions and comparing peaks of the dividing frequency regions with a preset critical intensity.

12. The image generating apparatus of claim 11, wherein the principal frequency region detection unit is configured to detect the principal frequency region based on a waveform of the frequency data corresponding to the tomographic image.

13. The image generating apparatus of claim 11, further comprising a frequency region transformation unit configured to transform a signal corresponding to the tomographic image into the frequency data, wherein the principal frequency region detection unit is configured to detect a principal frequency region corresponding to a portion of the frequency data.

14. An image generating apparatus comprising:

a principal frequency region detection unit configured to detect a principal frequency region corresponding to a portion of a frequency data corresponding to a tomographic image;

a sub frequency region determination unit configured to determine a plurality of sub frequency regions within the principal frequency region; and an image generation unit configured to generate the tomographic image by synthesizing data of the plurality of sub frequency regions, wherein the image generation unit comprises:

a sub frequency region inverse-transformation unit configured to perform frequency inverse-transformation on data of each of the plurality of sub frequency regions;

a vertical direction frequency region transformation unit configured to form a plurality of sub images by transforming each data obtained from the frequency inverse-transformation into data of a frequency region with respect to a depth direction of a target; and a synthesis unit configured to generate the tomographic image by synthesizing the plurality of sub images.

15. The image generating apparatus of claim 14, wherein the synthesis unit is configured to generate the tomographic image by calculating an average of pixel data of the plurality of the sub images.

16. The image generating apparatus of claim 14, wherein the sub frequency region determination unit is configured to determine a plurality of sub frequency regions so that adjacent sub frequency regions are spaced apart from each other at regular intervals.

17. An image generating apparatus comprising:

a principal frequency region detection unit configured to detect a principal frequency region corresponding to a portion of a frequency data corresponding to a tomographic image;

a sub frequency region determination unit configured to determine a plurality of sub frequency regions within the principal frequency region; and an image generation unit configured to generate the tomographic image by synthesizing data of the plurality of sub frequency regions, wherein the data of the frequency region is distributed symmetrically about a central frequency, and the principal frequency region detection unit is configured to detect as the principal frequency region only one of the frequency regions symmetrical to each other about the central frequency.

18. An image generating apparatus comprising:
a principal frequency region detection unit configured to detect a principal frequency region corresponding to a portion of a frequency data corresponding to a tomographic image;
a sub frequency region determination unit configured to determine a plurality of sub frequency regions within the principal frequency region; and
an image generation unit configured to generate the tomographic image by synthesizing data of the plurality of sub frequency regions,
wherein the principal frequency region detection unit is configured to detect a principal frequency partial region corresponding to a portion of a frequency region of each of respective pieces of row data of a plurality of frequency regions corresponding to a plurality of partial images, and to detect the principal frequency region from the detected principal frequency partial regions.

19. The image generating apparatus of claim 18, wherein the principal frequency partial region detection unit is configured to detect the principal frequency partial region for each piece of row data by comparing each piece of row data with a preset critical intensity, and to detect a frequency region including all of the detected principal frequency partial regions as the principal frequency region.

20. An optical coherence tomography (OCT) apparatus comprising:
a light generation unit configured to generate an optical signal;
an interferometer configured to split the optical signal into a measurement signal and a reference signal and applies the measurement signal to a target;
a detector configured to detect a coherence signal generated by interference between a response signal received from the target and the reference signal; and
an image processing device comprising a processor and configured to generate a tomographic image from the coherence signal,
wherein the image processing device comprises:
a frequency region transformation unit configured to transform the coherence signal into data of a frequency region;
a principal frequency region detection unit configured to detect a principal frequency region corresponding to a portion of the data of the frequency region;
a sub frequency region determination unit configured to determine a plurality of sub frequency regions from the data of the frequency region based on the principal frequency region; and
an image generation unit configured to generate a tomographic image by using data of the plurality of sub frequency regions,
wherein the principal frequency region detection unit detects the principal frequency region by dividing the frequency data into frequency regions and comparing peaks of the divided frequency regions with a preset critical intensity.

21. An optical coherence tomography (OCT) apparatus comprising:
a light generation unit configured to generate an optical signal;
an interferometer configured to split the optical signal into a measurement signal and a reference signal and applies the measurement signal to a target;
a detector configured to detect a coherence signal generated by interference between a response signal received from the target and the reference signal; and
an image processing device comprising a processor and configured to generate a tomographic image from the coherence signal,
wherein the image processing device comprises:
a frequency region transformation unit configured to transform the coherence signal into data of a frequency region;
a principal frequency region detection unit configured to detect a principal frequency region corresponding to a portion of the data of the frequency region;
a sub frequency region determination unit configured to determine a plurality of sub frequency regions from the data of the frequency region based on the principal frequency region; and
an image generation unit configured to generate a tomographic image by using data of the plurality of sub frequency regions,
wherein the image processing device comprises:
a sub frequency region inverse-transformation unit configured to perform frequency inverse-transformation on data of each sub frequency region;
a vertical direction frequency region transformation unit configured to form a plurality of sub images by transforming each data obtained from the frequency inverse-transformation into data of a frequency region with respect to a depth direction of a target; and
a synthesis unit configured to generate the tomographic image by synthesizing the plurality of sub images.

* * * * *